United States Patent [19]

Watanabe

[11] 4,395,237
[45] Jul. 26, 1983

[54] AMPHIBIOUS BICYCLE

[76] Inventor: Yaichi Watanabe, 5-11 Kitakasugaoka, 4-Chome, Ibaraki-Shi, Osaka-Fu, Japan

[21] Appl. No.: 241,204

[22] Filed: Mar. 6, 1981

Related U.S. Application Data

[63] Continuation of Ser. No. 971,885, Dec. 21, 1978, abandoned.

[30] Foreign Application Priority Data

Dec. 24, 1977 [JP] Japan ................ 52-156205

[51] Int. Cl.³ .............................................. B60F 3/00
[52] U.S. Cl. ...................................... 440/27; 114/270; 440/98; 440/100
[58] Field of Search ............... 440/12, 21, 24, 26–32, 440/49, 51, 90–93, 98, 100, 99; 114/270; 9/310 F; 416/84, 85

[56] References Cited

U.S. PATENT DOCUMENTS

| | | | |
|---|---|---|---|
| 839,476 | 12/1906 | Hartlett | 440/30 |
| 1,060,620 | 5/1913 | Osofs et al. | 114/270 |
| 1,104,229 | 7/1914 | Szegel | 440/30 |
| 3,091,209 | 5/1963 | Leiberman | 440/30 |
| 3,249,084 | 5/1966 | Plants | 440/27 X |
| 3,640,239 | 2/1972 | Petruskey | 440/12 |
| 3,987,747 | 10/1976 | Locher | 114/270 |
| 4,077,351 | 3/1978 | Girona | 440/30 |
| 4,092,945 | 6/1978 | Ankert et al. | 114/270 |

FOREIGN PATENT DOCUMENTS 977196 10/1948 France.

Primary Examiner—Douglas C. Butler
Attorney, Agent, or Firm—LeBlanc, Nolan, Shur & Nies

[57] ABSTRACT

An amphibious vehicle comprises a bicycle wherein the ends of the front wheel shaft and the rear wheel hub shaft are laterally outwardly projected; a water-surface floating apparatus composed of floats each being provided with a foldable air-tight bag and float mounting members therefor loosely rotatable on each of the opposite sides of the bicycle on the front wheel shaft and the rear wheel shaft; a water-surface propulsion apparatus driven through rotation of the rear wheel; and a water-surface steering apparatus mounted on the front wheel.

7 Claims, 12 Drawing Figures

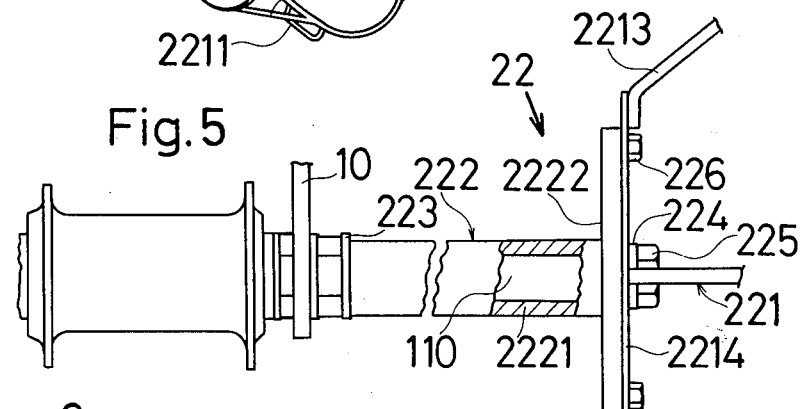
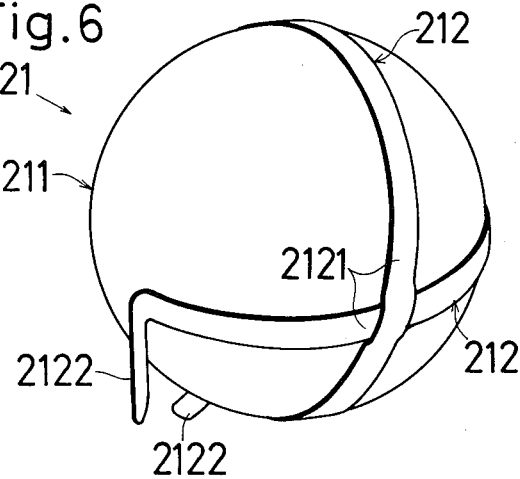
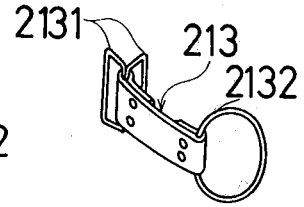

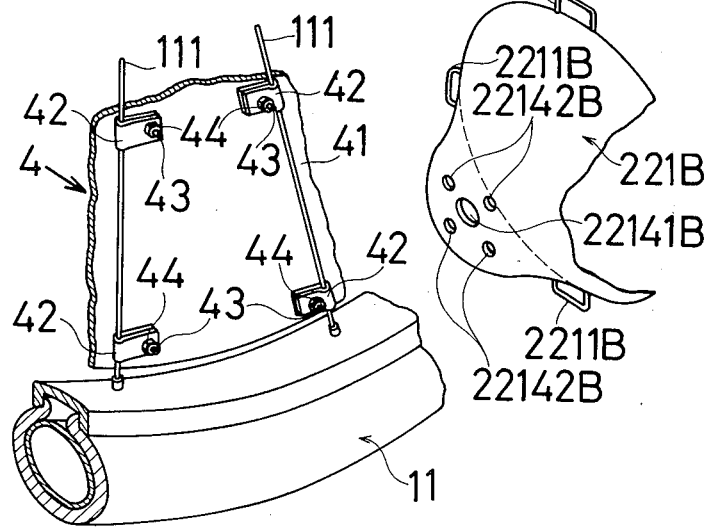
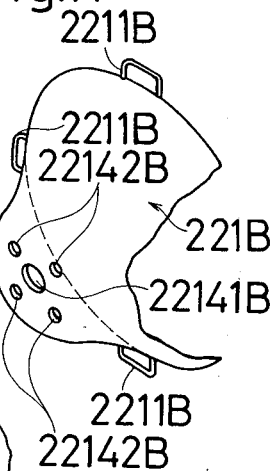
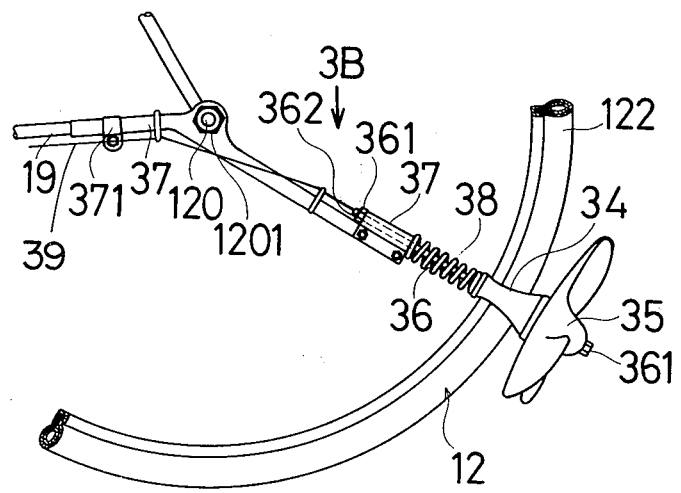

AMPHIBIOUS BICYCLE

This is a continuation, of application Ser. No. 971,885, filed Dec. 21, 1978 and now abandoned.

The present invention relates to an amphibious vehicle and more particularly to an amphibious bicycle wherein apparatus necessary for water-surface running operation may be normally carried on a conventional bicycle.

Conventionally, it has been extremely difficult in practice to adapt, for water-surface running operation, the conventional type of bicycles used mainly for ground running operation. The major reason is that conventional types of bicycles are specially built only for ground running, and these bicycles would have difficulty in running on the ground if they were carrying apparatus required for the water-surface running operation installed and maintained in an inoperative location.

An object of the present invention is to provide an amphibious bicycle wherein the conventional type of bicycle can normally have the apparatus required for the water-surface running operation mounted thereon, and this apparatus does not cause bulky obstruction during the ground running operation and the rider has only the approximate weight and cycling burden of a camping bicycle.

According to the present invention, the front wheel hub shaft and the rear wheel hub shaft of the bicycle are projected respectively outwardly to an extent that their projections may not interfere with the ground running operation, float mounting frames are mounted respectively at both sides of the bicycle on the projections of the front wheel hub shaft and the rear wheel hub shaft, the float mounting frames are shaped to be carried on the projections of the front wheel hub shaft and the rear wheel hub shaft and are partially reversible so as to be respectively accommodated inwardly of the ends of the front wheel hub shaft and the rear wheel hub shaft when floats are not in use and the bicycle is running on land, and the floats are provided with flexible air-tight bags each capable of being expanded through gas injection and of being folded to smaller volume through gas exhaust.

Another object of the present invention is to provide an amphibious bicycle which can readily change into the water-surface running operation from the ground running operation, utilizing apparatus required for the water-surface running operation already mounted on the bicycle.

According to the present invention, the float mounting frames are freely rotatably mounted with respect to the front wheel hub shaft and the rear wheel hub shaft. Also, each of the floats assumes a rolling shape when the float is filled with gas, and is loosely rotatable together with the float mounting frame when contacted with the ground.

A further object of the present invention is to provide an amphibious bicycle wherein special power is not required when the running operation has been changed into the water-surface operation, the water-surface running operation can be performed through the normal pedalling operation as in the ground running operation, and water-surface steering operation can be performed through the turning of the handle bars as in the ground running operation, and the bicycle is protected against the impacts on the water surface and is stable while floating. The bicycle according to the present invention comprises a water-surface propulsion apparatus provided with a plurality of paddle blades or vanes on the rear wheel located so that the paddle blades may not interfere with the rotation of the rear wheel, or a water-surface propulsion apparatus provided with a screw propeller rotating together with a rotor capable of being driven by contact against the rear wheel tire, a water-surface steering apparatus provided with steering plates mounted on the front wheel or on the bicycle body portion that is to be turned together with the front wheel and so located so that the steering plates may not interfere with wheel rotation.

BRIEF DESCRIPTION OF DRAWINGS

FIG. 4 is an enlarged perspective view of a float mounting frame in the form of a cage.

FIG. 5 is fragmentary view showing mainly a flanged sleeve of a float mounting frame mounted for free rotation on the wheel hub shaft of the amphibious bicycle of FIG. 1.

FIG. 6 is an enlarged perspective view of a float used in the amphibious bicycle of the invention.

FIG. 7 is an enlarged perspective view of a coupling band used with the float of FIG. 6.

FIG. 10 is an enlarged perspective view showing a water-surface steering apparatus used in the amphibious bicycle of the invention.

FIG. 11 is a perspective view showing a partially cut float mounting saucer, which is an alternative of the cage of FIG. 4.

FIG. 12 is a perspective view showing a water-surface propulsion apparatus in another embodiment.

PREFERRED EMBODIMENTS

Figure 1:
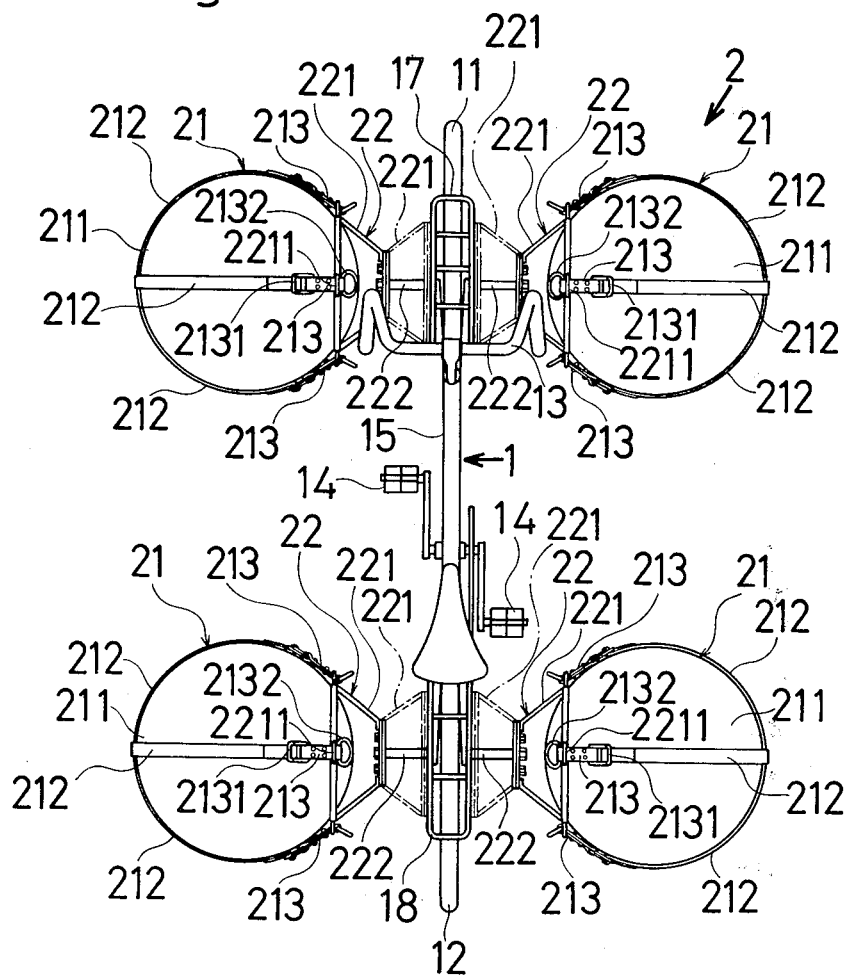
FIG. 1 is a plan view showing an amphibious bicycle according to a preferred embodiment, when water-surface floating apparatus is ready for water-surface running operation.
Figure 2:
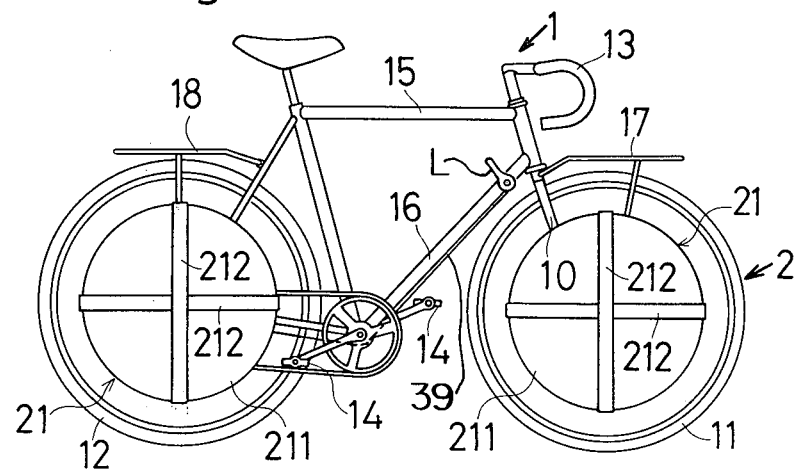
FIG. 2 is a side view of the amphibious bicycle of FIG. 1.

A bicycle 1 is provided with a body 10 and ground engaging front and rear wheels 11 and 12 respectively. A front wheel hub shaft 110 and a rear wheel hub shaft 120 are each projected outwardly within the horizontal width range of a handle bar 13. The front wheel hub shaft 110 and the rear wheel hub shaft 120 are preferably larger respectively in outer diameter than those of the common bicycles. The bicycle frame may be tubular and comprises a top tube 15 and a downwardly inclined tube 16.

A water-surface floating apparatus 2 is composed of four floats 21 and four float mounting frames 22. Each of the floats 21 is of rollable shape, such as ball-shape, and each of the floats preferably comprises an inflatable flexible air-tight bag 211 which is spherical when inflated and can be flexibly folded into smaller volume when the gas or air has been exhausted.

Also, each float 21 has two sets of fixing bands 212 extending crosswise at about 90° on the surface of the inflated air-tight bag 211 with the middle portions 2121 (FIG. 6) of the fixing bands being secured to the surface of the bag. The respective ends 2122 of each of the fixing bands 212 are removably mounted, through coupling bands 213, on hangers 2211 of the associated float mounting frame 22. Each of the coupling bands 213 is provided at one end with a pair of lock fixtures 2131 (FIG. 7) for coupling at its optional position to an end 2122 of a fixing band 212, and each of the coupling bands 213 is provided, at its other end, with a lock metal fixture 2132 for hooking on one of the hangers 2211 of float mounting frame 22.

Each float mounting frame 22 is provided with a cage 221, which is composed of a circular ring 2212 with four hangers 2211 mounted thereon and a plate 2214 which supports the circular ring 2212 through longitudinal arms 2213. The circular ring 2212 of the cage 221 has an inside diameter which is smaller than the outside diameter of an inflated float 21, so that the fixing bands 212 and the coupling bands 213 may embrace the inflated float 21 and hold it on the float mounting frame. Also, plate 2214 has a hole 22141, into which the front wheel hub shaft 110 or the rear wheel hub shaft 120 loosely can be introduced.

The float mounting frame 22 is provided with a flange pipe or collar 222 composed of a tubular portion 2221 which freely rotatably surrounds the associate front wheel hub shaft 110 or rear wheel hub shaft 120, and a flange 2222 provided with tapped holes (not shown) into which bolts 226 can be screwed. Thus each cage 221 is secured to a flange pipe 222 by bolts 226. Washers 223 and 224 and a lock nut 225 confine flange pipe 222 namely float mounting frame 22 against longitudinal movement.

A saucer 221B, as shown in FIG. 11, may be used as a portion of the float mounting frame 22 instead of the cage 221. The saucer 221B is provided with four hangers 2211B, which are similar to the hangers 2211 of the cage, and a shaft hole 2241B, four bolt holes 22142B, which are similar to plate hole 22141 and the four bolt holes 22142 of the cage.

Figure 8:
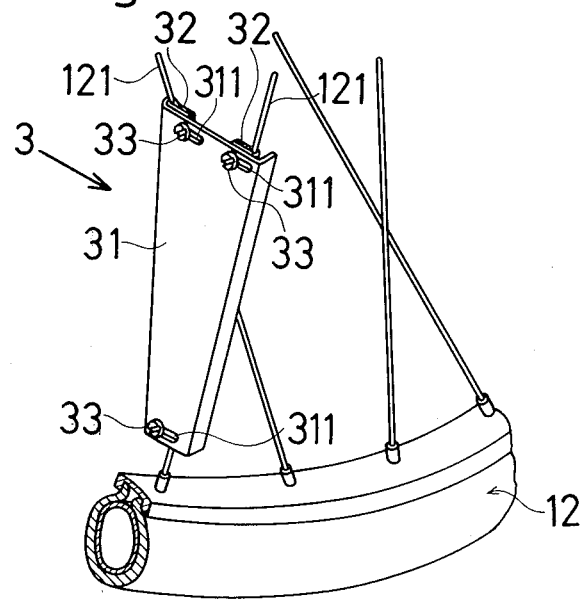
FIG. 8 is an enlarged perspective view showing one form of a water-surface propulsion apparatus mounted on the rear wheel spokes in the amphibious bicycle of the invention.
Figure 9:
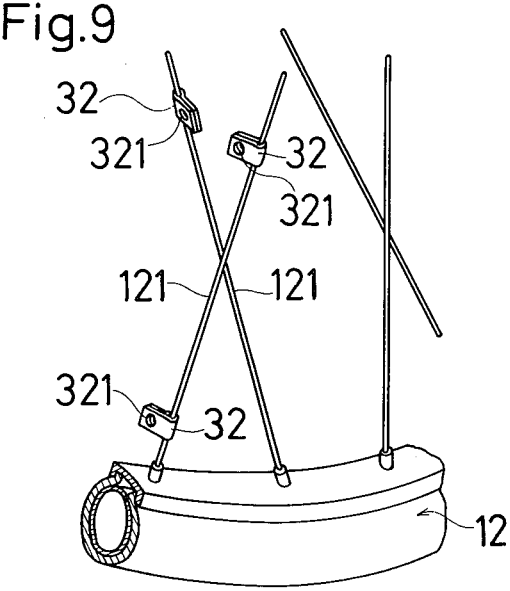
FIG. 9 is a perspective view showing support members for the propulsion paddle of FIG. 8.

A water-surface propulsion apparatus 3 (FIGS. 8, 9) is attached to the spokes of rear wheel 12. Preferably this comprises a plurality of sets, each set having three support members 32, one paddle blade or vane 31, three screws 33 and three nuts (not shown) to be engaged with the screws. Each of the support members is a small plate with two holes 321 being provided respectively in its ends, the small plate being folded upon a rear wheel spoke 121. Each of the blades 31 is formed within the range where the blade width does not interfere with the rotation of the rear wheel 12. Also, each of the blades 31 has three slots 311 formed therein. Each of three screws 33 is inserted into a slot 311 and a pair of holes 321 of the member 32 and is engaged with a nut (not shown) to secure the blade 31 onto adjacent spokes 121. As shown the blades 31 are disposed sufficiently transversely of the path of rotation of the rear wheel 12 as to will act as rotary paddles when the wheel rotates.

A water-surface steering apparatus 4 (FIG. 10) is provided with a steering plate 41, support members 42 which may be the same as the support members 32 in the apparatus 3, a plurality of screws 43 and a plurality of nuts 44 to be engaged with the screws.

Each of four screws 43 is inserted into each of the holes (not shown) of the steering plate 41, a pair of holes (not shown) of the member 42 with the spoke 111 of the front wheel 11 being grasped therein, and is engaged with a nut 44 to secure the steering plate 41 onto the front wheel spokes 111 so that it may not interfere with the rotation and turning of the front wheel 11. The steering plate 41 is preferably annular and concentric with the front wheel 11 and extends in the general plane of rotation of that wheel.

Also, it is also included in the range of the present invention to mount the steering plate on the bicycle body portion such as the front wheel mounting fork which turns together with the front wheel, so that the steering plate may not interfere with the rotation and turning of the front wheel 11.

The amphibious bicycle of the present invention therefore comprises a water-surface floating apparatus 2 provided with floats which can be loosely and freely rotated even on the ground, a water-surface propulsion apparatus 3 mounted so as not to interfere with the rotation of the rear wheel, and a water surface steering apparatus 4 which is mounted so as not to interfere with the rotation and turning of the front wheel. Thus, the amphibious bicycle of the invention can change immediately to water-surface running from ground running and vice versa.

A rider can work pedals 14 to rotate the rear wheel 12. Through the pedalling operation, the paddle blades 31 of the water-surface propulsion apparatus 3 are rotated with the rear wheel for moving the bicycle forward in water. The steering operation can be performed through turning of the handle bars 13. In addition, since the float mounting frames 22 and floats 21 of the water-surface floating apparatus 2 of the amphibious bicycle in accordance with the present invention are adapted to be freely rotated on the both sides of each of the front wheel hub shaft 110 and the rear wheel hub shaft 120, they are useful to minimize impulses and shocks received on the water-surface. Larger sized floats, each being close in size to the wheel diameter, if used, can convert more easily into water-surface running from ground running, thus being useful in more stable floating operation on the water-surface.

Figure 3:
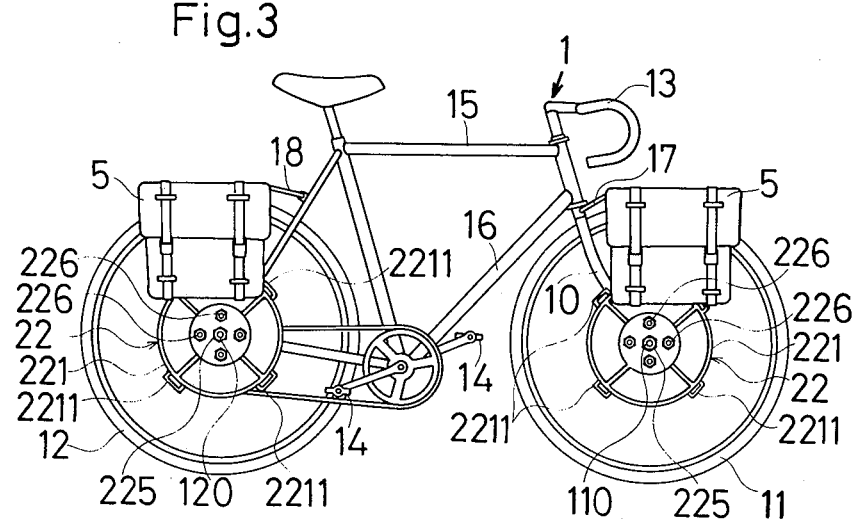
FIG. 3 is a side view of the amphibious bicycle according to the preferred embodiment, when the bicycle is ready for running on land.

When the amphibious bicycle of the present invention principally runs on ground, each of the floats 21 of the water-surface floating apparatus may be detached from the float mounting frame 22 and the compressed gas is exhausted from the float. Each of the floats may be folded into a small volume so that it may be accommodated into each of the side bags 5 (FIG. 3) suspended from the both sides of each of the front carrier frame 17 and the rear carrier frame 18. Each of the cages 221 of the frames 22 may be detached from the flange portion 2222 of each of the flange pipes 222. As shown in an imaginary lines of FIG. 1, each cage 221 may be selectively mounted on the flange portion 2222 with the direction of each of the cages 221 reversed. Thus each of the cages 221 can thus be accommodated or stored inwardly with respect to the outer ends of the front wheel hub shaft 110 and the rear wheel hub shaft 120 for carrying the cages on the bicycle when the floats are not in use. Also, no problems occur during the ground running operation even though the water-surface propulsion apparatus 3 and the water-surface steering apparatus 4 are attached on the front wheel 11 and the rear wheel 12 respectively.

Another embodiment of the water-surface propulsion apparatus is shown in FIG. 12. A water-surface propulsion apparatus 3B is composed of a conical-shaped rotor 34 for rotational driving contact against the side of rear wheel tire 122, a screw propeller 35 together with rotor 34, a support shaft 36, which has the rotor 34 and the screw propeller 35 rotatably mounted thereon, and having lock nuts 361 respectively on its ends, a fixed frame 37 axially slidably supporting shaft 36, a compression coil spring 38 externally surrounding shaft 36 between frame 37 and rotor 34 for normally biasing the cone surface of the rotor 34 away from contact with the rear wheel tire, a wire 39 coupled at its one end to the end portion 362 of shaft 36, and a known actuating lever assembly (not shown) which is coupled to the other end of the wire 39 and is mounted on the handle bar 13, top tube 15 or down tube 16. The frame 37 is fixed by a lock nut 1201 on the rear wheel hub shaft frame support. Frame 37 is secured to a chain stay 19 by a band 371, whereby it is detachably mounted on the bicycle body.

The bicycle can change to the water-surface running operation immediately from the ground running operation and vice versa with the water-surface floating apparatus 2, the water-surface propulsion apparatus 3B and the water-surface steering apparatus 4 attached on the bicycle. Once the rider works the pedal 14 on the water-surface to rotate rear wheel 12, the lever apparatus (not shown) is operated to pull the wire 39 so that shaft 36 moves against the elasticity of the spring 38 to engage rotor 34 against the rear wheel tire 122 thereby to rotate the propeller 35, whereby the bicycle will be forwardly moved in the water.

When the amphibious bicycle mainly runs on the ground, the entire water-surface propulsion apparatus 3B is not required to be removed from the bicycle body. However preferably the rotor 34, propeller 35, shaft 36 and spring 38 are removed and can be accommodated in a bag 5 for carrying purposes.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An amphibious vehicle comprising a bicycle having a body and ground engaging front and rear wheels for running on land, front wheel shaft means and rear wheel shaft means respectively on said body, each of said shaft means having opposite end portions projecting transversely outwardly of the body, a float mounting frame freely rotatably mounted on each end of each shaft means, and floats detachably securable one to each float mounting frame, each float being an inflatable air-tight bag capable of being inflated into a ball-like shape, each of said float mounting frames comprising a cage within which part of the inflated float may be disposed, and with each of said float mounting frames including a flanged sleeve which surrounds the associated shaft means with said cage connected with said flanged sleeve, and means for mounting each cage on the respective flanged sleeve with the direction of each of the cages reversed so that each cage may be accommodated inwardly of the end of the associated shaft means.

2. The amphibious vehicle as defined in claim 1, wherein each float has fixing bands secured to the surface of the bag, and ends of the fixing bands are respectively coupled with respective hangers of the associated cages through respective coupling bands.

3. The amphibious vehicle as defined in claim 1, further including propulsion means for moving the vehicle when it is in water including at least one blade member secured to the spokes of the rear wheel, whereby said propulsion means does not interfere with running of the vehicle on land.

4. The amphibious vehicle as defined in claim 1, further including propulsion means for moving the vehicle when it is in water including a rotor which is movably mounted on the body so that it may be brought into and out of contact with the rear wheel tire for rotation thereby, and a screw propeller that rotates with said rotor, whereby said propulsion means does not interfere with running of the vehicle on land.

5. The amphibious vehicle as defined in claim 1, further including steering means for turning the vehicle when it is in water including at least one steering plate secured on the spokes of the front wheel, whereby said steering means does not interfere with running of the vehicle on land.

6. The amphibious vehicle as defined in claim 1, wherein each cage includes a circular ring member the center of which corresponds with the longitudinal axis of the respective shaft means.

7. The amphibious vehicle as defined in claim 6, wherein the inside diameter of the circular ring member is smaller than the outside diameter of the float when inflated.

* * * * *